United States Patent
Sawabe et al.

(10) Patent No.: US 12,487,593 B2
(45) Date of Patent: Dec. 2, 2025

(54) REMOTE CONTROL APPARATUS, REMOTE CONTROL METHOD, AND REMOTE CONTROL SYSTEM

(71) Applicant: NEC Corporation, Tokyo (JP)

(72) Inventors: Anan Sawabe, Tokyo (JP); Takanori Iwai, Tokyo (JP)

(73) Assignee: NEC CORPORATION, Tokyo (JP)

( * ) Notice: Subject to any disclaimer, the term of this patent is extended or adjusted under 35 U.S.C. 154(b) by 384 days.

(21) Appl. No.: 18/017,161

(22) PCT Filed: Jul. 31, 2020

(86) PCT No.: PCT/JP2020/029438
§ 371 (c)(1),
(2) Date: Jan. 20, 2023

(87) PCT Pub. No.: WO2022/024346
PCT Pub. Date: Feb. 3, 2022

(65) Prior Publication Data
US 2023/0259122 A1    Aug. 17, 2023

(51) Int. Cl.
*G05D 1/00*    (2024.01)
*G08G 1/16*    (2006.01)
*H04L 43/087*    (2022.01)

(52) U.S. Cl.
CPC ............. *G05D 1/0022* (2013.01); *G08G 1/16* (2013.01); *H04L 43/087* (2013.01)

(58) Field of Classification Search
CPC ....... G05D 1/0022; G08G 1/16; H04L 43/087
See application file for complete search history.

(56) References Cited

U.S. PATENT DOCUMENTS

| 11,153,721 | B2* | 10/2021 | Graefe | G08G 1/04 |
| 2020/0050185 | A1* | 2/2020 | Shimotsuma | B60W 30/09 |
| 2023/0262575 | A1* | 8/2023 | Kobayashi | G08G 1/09 370/328 |

FOREIGN PATENT DOCUMENTS

| JP | 2010-191625 A | 9/2010 |
| JP | 2014-147105 A | 8/2014 |
| JP | 2018-106676 A | 7/2018 |
| JP | 2019-142265 A | 8/2019 |
| JP | 2020-027606 A | 2/2020 |

OTHER PUBLICATIONS

International Search Report for PCT Application No. PCT/JP2020/029438, mailed on Oct. 6, 2020.

* cited by examiner

*Primary Examiner* — Luke Huynh
(74) *Attorney, Agent, or Firm* — Sughrue Mion, PLLC

(57) ABSTRACT

A remote control system (100) according to the present disclosure includes: a delay jitter specification unit (101) configured to specify a delay jitter distribution in a network that performs communication with a mobile object serving as a target to be monitored; a degree-of-risk specification unit (102) configured to specify a degree of risk of the mobile object on the basis of the specified delay jitter distribution, and a state of the mobile object; and a control unit (103) configured to control the mobile object on the basis of the specified degree of risk.

18 Claims, 12 Drawing Sheets

REMOTE CONTROL APPARATUS, REMOTE CONTROL METHOD, AND REMOTE CONTROL SYSTEM

This application is a National Stage Entry of PCT/JP2020/029438 filed on Jul. 31, 2020, the contents of all of which are incorporated herein by reference, in their entirety.

TECHNICAL FIELD

The present disclosure relates to a remote control apparatus, a remote control method, and a remote control system.

BACKGROUND ART

In recent years, a technology for avoiding a collision accident of a vehicle at an intersection or the like has been proposed.

For example, Patent Literature 1 discloses that brake assistance control is activated, in a case where the time to collision (TTC), which is a remaining time period before collision of a vehicle, is less than or equal to a reference value or in a case where the time headway, which is calculated by dividing a distance between vehicles by the traveling speed of a vehicle, is less than or equal to a reference value.

Furthermore, Patent Literature 2 discloses that it is determined whether a vehicle needs to be warned to reduce speed, on the basis of the traveling speed of the vehicle, a timing at which speed is to be reduced, or a degree of deceleration required for the vehicle to stop at the stop line.

CITATION LIST

Patent Literature

Patent Literature 1: Japanese Unexamined Patent Application Publication No. 2019-142265
Patent Literature 2: Japanese Unexamined Patent Application Publication No. 2010-191625

SUMMARY OF INVENTION

Technical Problem

Meanwhile, in some cases, in a remote control apparatus that is located in a remote place that is apart from a place where a mobile object, such as a vehicle, serving as a target to be monitored moves, the mobile object is controlled. In these cases, the remote control apparatus performs communication with the mobile object via a network, obtains information indicating a state of the mobile object, and controls the mobile object on the basis of the obtained information.

However, in a case where the remote control apparatus controls the mobile object, delay jitter in the network that performs communication with the mobile object exerts a great influence. The delay jitter serves as an indicator indicting the stability of a delay variation of communication. If delay jitter is large, control performed on the mobile object significantly depends on a communication state of the network. Therefore, there is a problem in which it is difficult to appropriately control the mobile object depending on the communication state of the network in some cases.

In view of this, it is an object of the present disclosure to solve the problem described above, and provide a remote control apparatus, a remote control method, and a remote control system that are capable of appropriately controlling a mobile object.

Solution to Problem

A remote control apparatus in one aspect includes:
a delay jitter specification unit configured to specify a delay jitter distribution in a network that performs communication with a mobile object serving as a target to be monitored;
a degree-of-risk specification unit configured to specify a degree of risk of the mobile object on the basis of the delay jitter distribution that has been specified, and a state of the mobile object; and
a control unit configured to control the mobile object on the basis of the degree of risk that has been specified.

A remote control method in one aspect includes:
a first step of specifying a delay jitter distribution in a network that performs communication with a mobile object serving as a target to be monitored;
a second step of specifying a degree of risk of the mobile object on the basis of the delay jitter distribution that has been specified, and a state of the mobile object; and
a third step of controlling the mobile object on the basis of the degree of risk that has been specified.

A remote control system in one aspect includes:
a delay jitter specification unit configured to specify a delay jitter distribution in a network that performs communication with a mobile object serving as a target to be monitored;
a degree-of-risk specification unit configured to specify a degree of risk of the mobile object on the basis of the delay jitter distribution that has been specified, and a state of the mobile object; and
a control unit configured to control the mobile object on the basis of the degree of risk that has been specified.

Advantageous Effects of Invention

In the aspects described above, an effect by which a remote control apparatus, a remote control method, and a remote control system that are capable of appropriately controlling a mobile object can be provided can be exhibited.

EXAMPLE EMBODIMENT

Example embodiments of the present disclosure are described below with reference to the drawings. Note that in the description and drawings described below, omission and simplification are made as appropriate, for clarity of description. Furthermore, in each of the drawings described below, the same elements are denoted by the same reference signs, and a duplicate description is omitted as necessary. Moreover, in each of the example embodiments described below, description is provided under the assumption that a mobile object serving as a target to be monitored is a vehicle such as an automobile, but the mobile object is not limited to the vehicle.

First Example Embodiment

First, an example of the entire configuration of a remote control system 1 according to the present first example embodiment is described with reference to FIG. 1.

Figure 1:
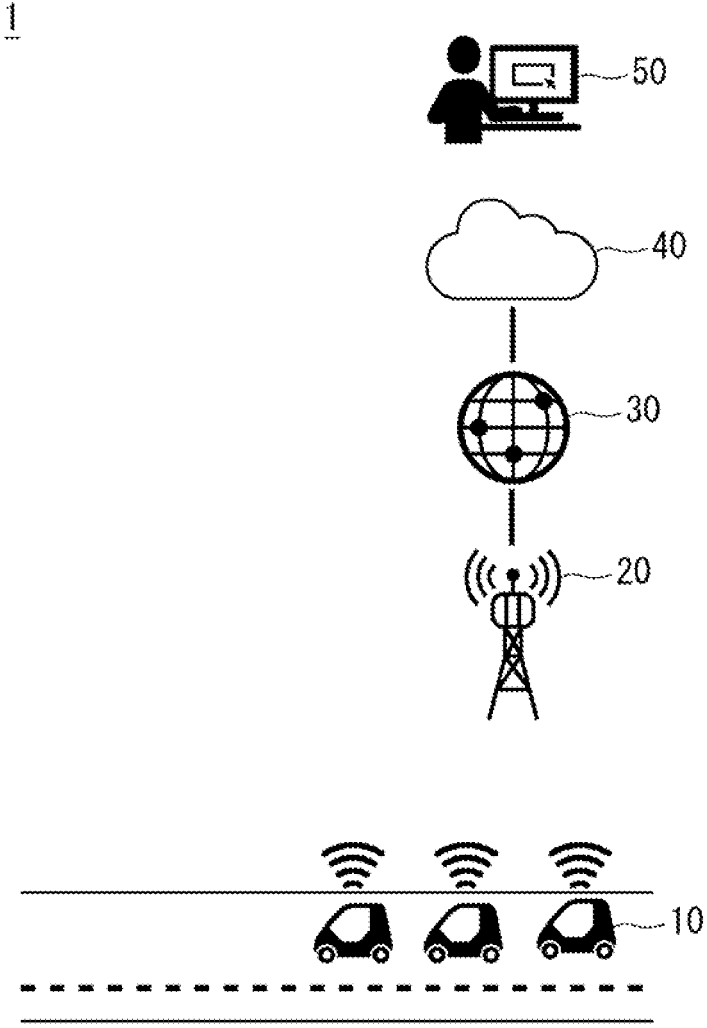
FIG. 1 is a diagram illustrating an example of the entire configuration of a remote control system according to a first example embodiment.

As illustrated in FIG. 1, the remote control system 1 according to the present first example embodiment includes a vehicle 10 and a remote control apparatus 50.

The vehicle 10 is connected to a base station 20 through a wireless network. The wireless network is a network such as 3rd generation (3G), 4G/long term evolution (LTE), 5G, local 5G, or wireless fidelity (Wi-Fi).

The vehicle 10 is further connected through the base station 20 and the Internet 30 to the remote control apparatus 50 that is disposed on a cloud 40. However, this is not restrictive, and an aspect may be employed where the vehicle is directly connected to a network on a side of the remote control apparatus 50 through the wireless network without using the Internet 30.

Next, examples of configurations of the vehicle 10 and the remote control apparatus 50 according to the present first example embodiment are described with reference to FIG. 2.

Figure 2:
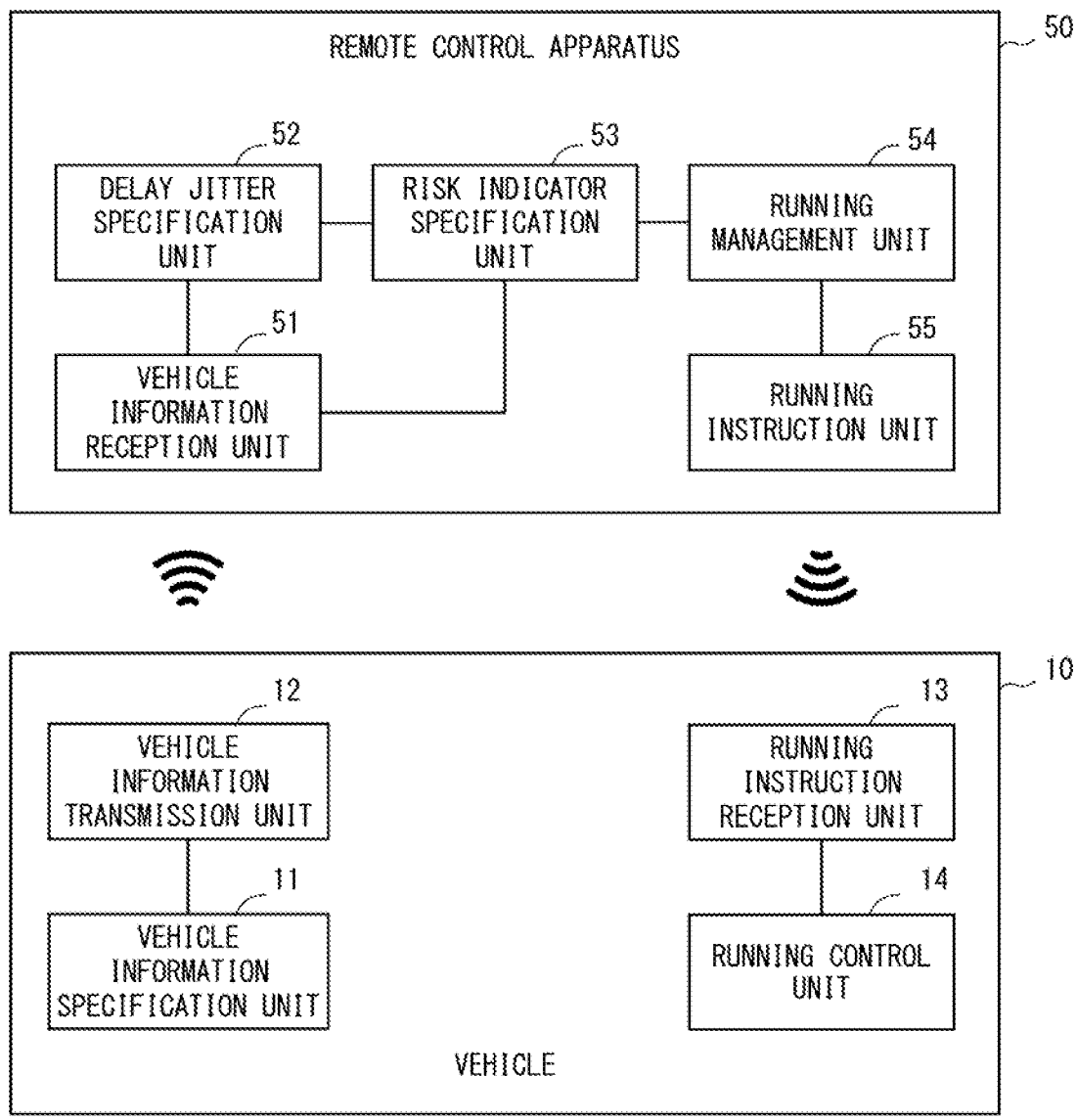
FIG. 2 is a block diagram illustrating examples of configurations of a vehicle and a remote control apparatus according to the first example embodiment.

As illustrated in FIG. 2, the vehicle 10 according to the present first example embodiment includes a vehicle information specification unit 11, a vehicle information transmission unit 12, a running instruction reception unit 13, and a running control unit 14.

The vehicle information specification unit 11 specifies a state of the vehicle 10.

The vehicle information transmission unit 12 transmits, to the remote control apparatus 50, a packet including vehicle information indicating the state of the vehicle 10 that has been specified by the vehicle information specification unit 11.

Note that in the present first example embodiment, it is assumed that the vehicle information specification unit 11 specifies at least a position and speed of the vehicle 10, and the vehicle information includes at least a time stamp, and information relating to a position and speed of the vehicle 10 at the time indicated by the time stamp. However, this is not restrictive, and the vehicle information may also include information indicating a state or the like of a steering wheel or a residual amount of fuel of the vehicle 10.

The running instruction reception unit 13 receives a packet including a running instruction from the remote control apparatus 50, as described later.

The running control unit 14 controls the running of the vehicle 10 on the basis of the running instruction included in the packet that has been received from the remote control apparatus 50. For example, if the vehicle 10 is an automated driving vehicle, it is conceivable that the running control unit 14 performs control, for example, to apply the sudden brakes or reduce traveling speed. Furthermore, in a case where the vehicle 10 is an automated driving vehicle, and has been switched from automated driving to remote driving, it is conceivable that the running control unit 14 stops control of automated driving. Furthermore, if the vehicle 10 is not an automated driving vehicle, it is conceivable that the running control unit 14 broadcasts, to a driver, the applying of the sudden brakes, a reduction in traveling speed, or the like, by using a sound message, a display message, or the like.

The remote control apparatus 50 according to the present first example embodiment includes a vehicle information reception unit 51, a delay jitter specification unit 52, a risk indicator specification unit 53, a running management unit 54, and a running instruction unit 55.

The vehicle information reception unit 51 receives the packet including the vehicle information from the vehicle 10.

The delay jitter specification unit 52 first calculates delay jitter in a network that performs communication with the vehicle 10. In the example of FIG. 1, the network that performs communication with the vehicle 10 is a network that includes the wireless network between the vehicle 10 and the base station 20, the Internet 30, and the network on a side of the remote control apparatus 50. For example, the delay jitter specification unit 52 can calculate delay jitter by using Formula 1 described below.

Delay jitter=reception time of $i$-th packet−reception time of $(i−1)$th packet  [Formula 1]

Next, the delay jitter specification unit 52 calculates a delay jitter distribution on the basis of the delay jitter calculated above. The delay jitter distribution can be calculated, for example, as a probability density function of delay jitter.

The risk indicator specification unit 53 first calculates the time to collision (TTC), which is a remaining time period before collision of the vehicle 10, on the basis of the vehicle information included in the packet received from the vehicle 10.

Here, it is assumed, for example, that the speed of a preceding vehicle i is $v_i$, a position of the preceding vehicle i is $p_i$, the reception time at which the vehicle information has been received from the preceding vehicle i is $\tau_i$, the speed of a subsequent vehicle j is $v_j$, a position of the subsequent vehicle j is $p_j$, the reception time at which the vehicle information has been received from the subsequent vehicle j is $\tau^j$, and a distance between the preceding vehicle i and the subsequent vehicle j is $d_{ij}$. In this case, the TTC at certain time $\tau$ is defined by using Formula 2 described below.

$$TTC_{(i,j)} = \frac{d_{ij}}{v_j - v_i} = \frac{(p_j + v_j(\tau - \tau_j)) - (p_i + v_i(\tau - \tau_i))}{v_j - v_i} \quad \text{[Formula 2]}$$

As described above, the vehicle information received from the vehicle 10 includes a time stamp, and information relating to a position and speed of the vehicle 10 at the time indicated by the time stamp.

Therefore, the risk indicator specification unit 53 can calculate the TTC of the vehicle 10 by using the vehicle information received from the vehicle 10 and Formula 2 described above.

Then, the risk indicator specification unit 53 specifies a risk indicator of the vehicle 10 on the basis of the TTC calculated above and the delay jitter distribution calculated by the delay jitter specification unit 52.

The running management unit 54 and the running instruction unit 55 control the vehicle 10 on the basis of the risk indicator of the vehicle 10 that has been specified by the risk indicator specification unit 53. Specifically, the running management unit 54 determines the content of running of the vehicle 10 on the basis of the risk indicator of the vehicle 10, and the running instruction unit 55 transmits, to the vehicle 10, a packet including a running instruction indicating the content of running of the vehicle 10 that has been determined by the running management unit 54. For example, it is conceivable that the running management unit 54 determines the applying of the sudden brakes, a reduction in traveling speed, or the like as the content of running of the vehicle 10. Furthermore, if the vehicle 10 is an automated driving vehicle, it is conceivable that the running management unit 54 performs determination to perform switching from automated driving to remote driving.

Note that the running management unit 54 may only determine the content of running of the vehicle 10 in a case where the risk indicator of the vehicle 10 that has been specified by the risk indicator specification unit 53 is greater than or equal to a value determined by a monitoring person (for example, in a case where the risk indicator falls under the region "risky" or "beware" described later). For example, it is conceivable that the running management unit 54 determinates that the vehicle 10 will apply the sudden brakes in a case where the risk indicator of the vehicle 10 is "risky", and the running management unit 54 determines that the traveling speed of the vehicle 10 will be reduced in a case where the risk indicator is "beware".

Here, an outline of an operation of the remote control system 1 according to the present first example embodiment is described with reference to FIG. 3.

Figure 3:
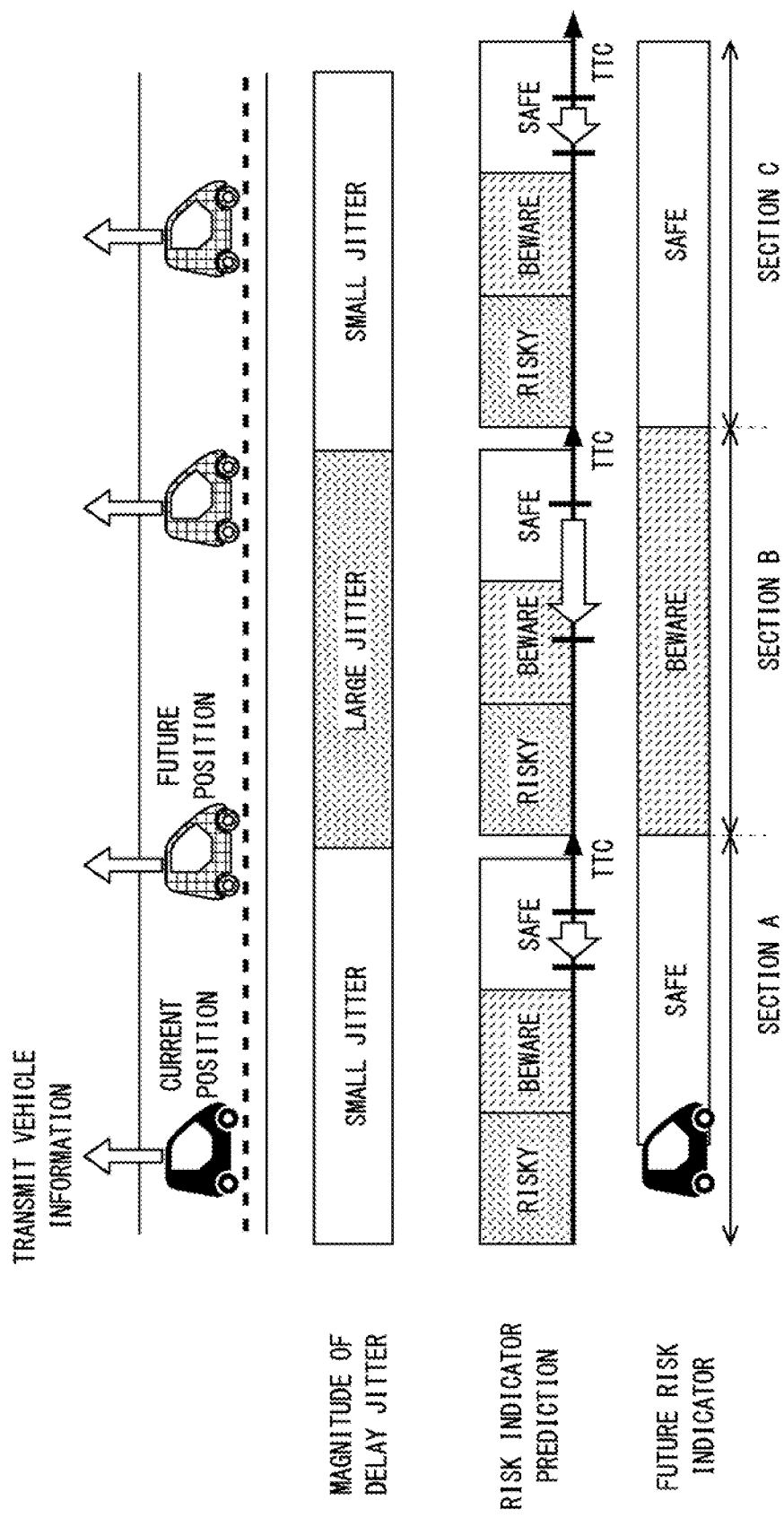
FIG. 3 is a diagram illustrating an outline of an operation of the remote control system according to the first example embodiment.

As illustrated in FIG. 3, the vehicle 10 transmits vehicle information to the remote control apparatus 50 in a current position and a future position to which the vehicle 10 will move in the future.

The delay jitter specification unit 52 calculates delay jitter and a delay jitter distribution in each of the sections where the vehicle 10 moves, and the risk indicator specification unit 53 specifies a risk indicator of the vehicle 10 in each of the sections where the vehicle 10 moves.

In this case, the delay jitter varies depending on geographical characteristics. In the example of FIG. 3, sections A and C have small delay jitter, and section B has large delay jitter.

Therefore, it can be considered that it is preferable that a running instruction to reduce traveling speed, or the like be provided to the vehicle 10 that is traveling in section B having large delay jitter, for safety.

Accordingly, the risk indicator specification unit 53 modifies the TTC of the vehicle 10 on the basis of the delay jitter distribution calculated by the delay jitter specification unit 52, and specifies a risk indicator of the vehicle 10 on the basis of the modified TTC.

In the example of FIG. 3, the risk indicator is classified into three classes, "risky", "beware", and "safe", depending on a threshold. The risk indicator specification unit 53 calculates the TTC of the vehicle 10 in section B, and the calculated TTC falls under the range "safe". However, section B has delay jitter that is larger than delay jitter of sections A and C. Therefore, the risk indicator specification unit 53 modifies the TTC in such a way that the TTC is shorter than the TTC in sections A and C. As a result, the modified TTC falls under the range "beware", and therefore the risk indicator specification unit 53 specifies that the risk indicator of the vehicle 10 is "beware".

Next, an operation of the risk indicator specification unit 53 according to the present first example embodiment is described in detail with reference to FIGS. 4 and 5. Note that FIG. 4 illustrates an operation in a related art for a comparison with the present first example embodiment, and FIG. 5 illustrates an operation according to the present first example embodiment.

Figure 4:
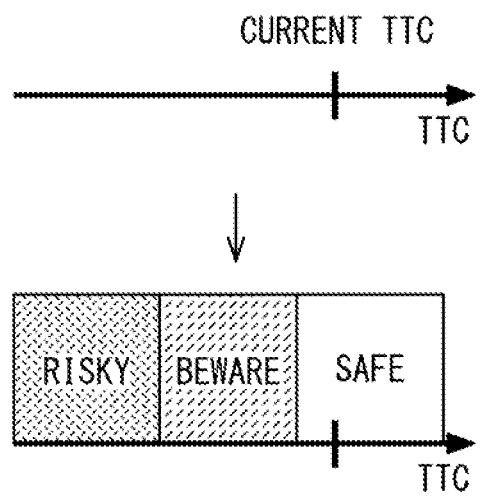
FIG. 4 is a diagram illustrating an example of an operation in a related art.

As illustrated in FIG. 4, in the related art, the TTC of the vehicle 10 is calculated, and a risk indicator is specified on the basis of the calculated TTC. In the example of FIG. 4, the calculated TTC falls under the range "safe". Therefore, in the related art, it is specified that the risk indicator of the vehicle 10 is "safe". Thus, in the related art, even if a section where the vehicle 10 moves is a section having large delay jitter, a running instruction to reduce traveling speed, or the like fails to be provided to the vehicle 10.

Figure 5:
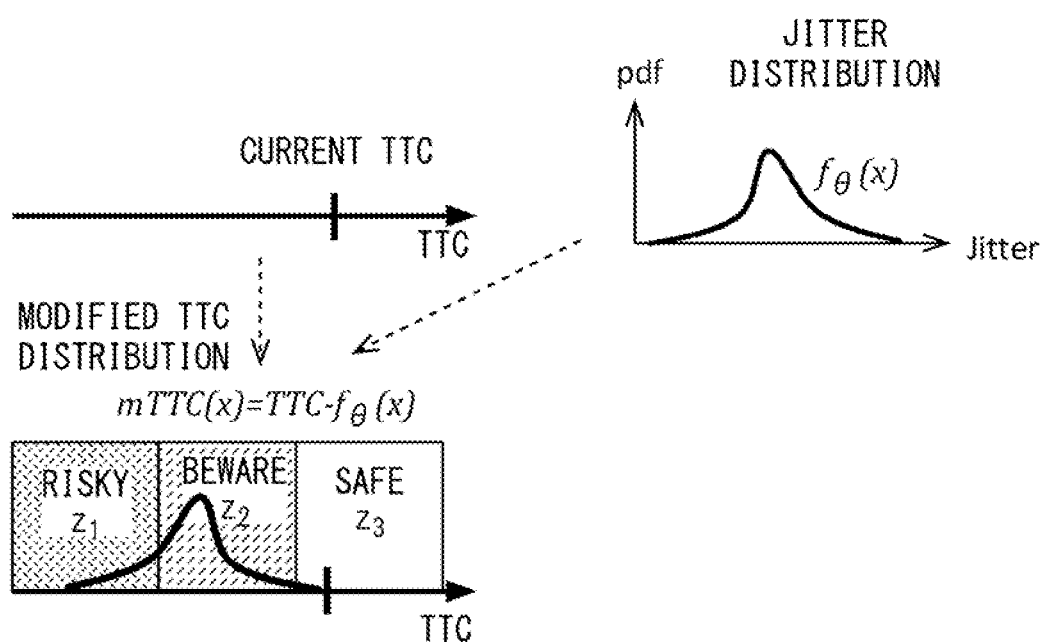
FIG. 5 is a diagram illustrating an example of an operation of a risk indicator specification unit according to the first example embodiment.

In contrast, as illustrated in FIG. 5, according to the present first example embodiment, the risk indicator specification unit 53 modifies the TTC that has been calculated for the vehicle 10 on the basis of the delay jitter distribution calculated by the delay jitter specification unit 52.

Here, as illustrated in FIG. 5, it is assumed that the delay jitter distribution has been given as a probability density function $f_\theta(x)$. In the delay jitter distribution illustrated in an upper right-hand side portion of FIG. 5, a horizontal axis indicates delay jitter, and a vertical axis indicates a probability density function (PDF) that corresponds to a probability of the delay jitter.

In the example of FIG. 5, the risk indicator specification unit 53 subtracts the delay jitter distribution from the TTC that has been calculated for the vehicle 10, and therefore the TTC is modified. In the example of FIG. 5, the modified TTC is indicated as mTTC.

Next, the risk indicator specification unit 53 calculates an area of mTTC in each of the zones "risky ($z_1$)", "beware ($z_2$)", and "safe ($z_3$)", by using Formula 3 described below.

$$p_{z_i} = \int_{min\ z_i}^{max\ z_i} mTTC(x)dx \quad \text{[Formula 3]}$$

Then, the risk indicator specification unit 53 specifies a risk indicator having a maximum area as a final risk indicator of the vehicle 10, as described in Formula 4 described below.

$$\text{RiskIndicator} = \arg_i \max p_{z_i} \quad \text{[Formula 4]}$$

In the example of FIG. 5, the area of "beware ($z_2$)" is maximum. Therefore, the risk indicator specification unit 53 specifies that a final risk indicator of the vehicle 10 is "beware ($z_2$)".

Next, an example of a flow of an operation of the remote control apparatus 50 according to the present first example embodiment is described with reference to FIG. 6.

Figure 6:
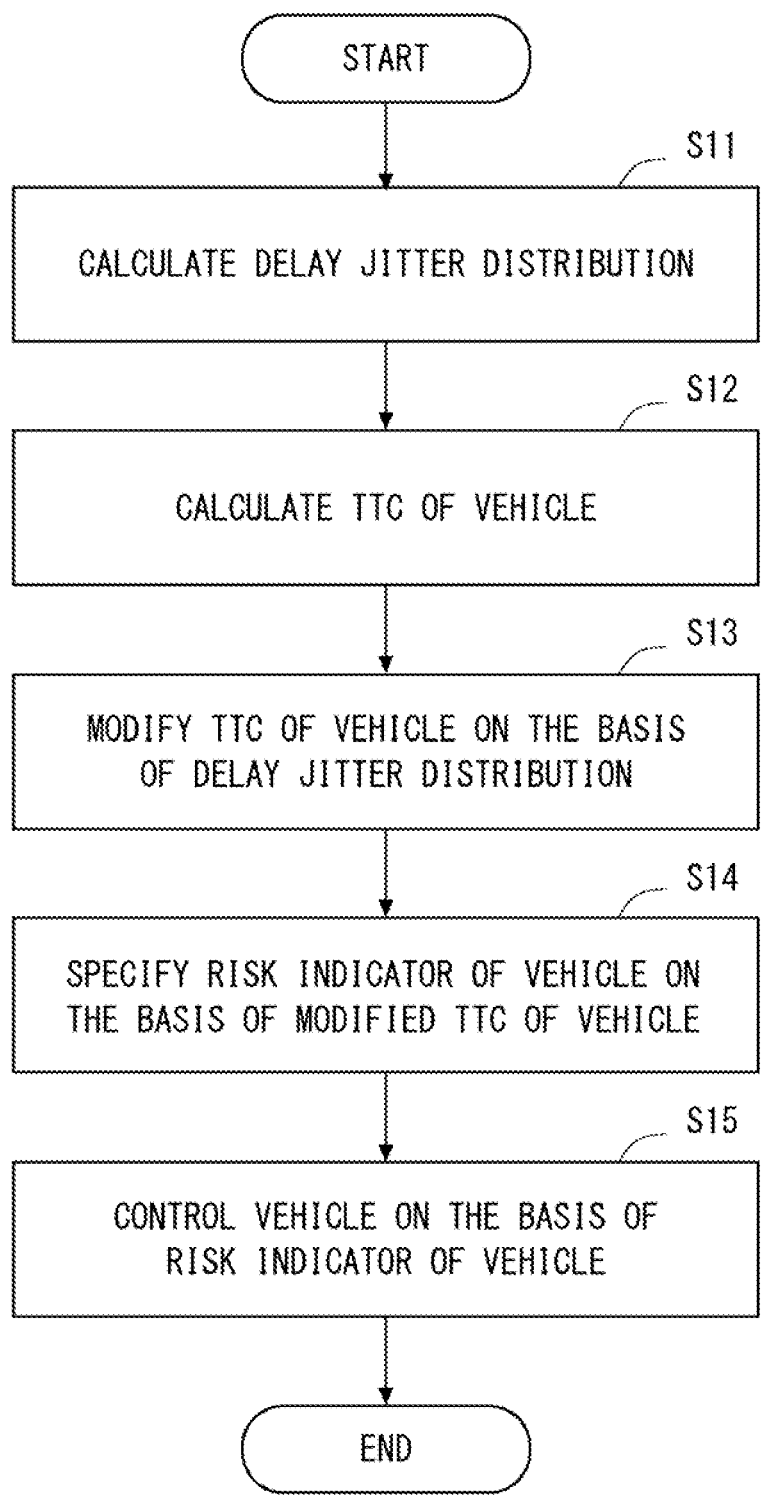
FIG. 6 is a flowchart illustrating an example of a flow of an operation of the remote control apparatus according to the first example embodiment.

As illustrated in FIG. 6, first, the delay jitter specification unit 52 calculates a delay jitter distribution in a network that performs communication with the vehicle 10 (step S11).

Next, the risk indicator specification unit 53 calculates the TTC of the vehicle 10 (step S12). Next, the risk indicator specification unit 53 modifies the TTC calculated in step S12 on the basis of the delay jitter distribution calculated in step S11 (step S13). Next, the risk indicator specification unit 53 specifies a risk indicator of the vehicle 10 on the basis of the TTC modified in step S13 (step S14).

Then, the running management unit 54 and the running instruction unit 55 control the vehicle 10 on the basis of the risk indicator of the vehicle 10 that has been specified in step S14 (step S15). Specifically, the running management unit 54 determines the content of running of the vehicle 10 on the basis of the risk indicator of the vehicle 10, and the running instruction unit 55 transmits, to the vehicle 10, a running instruction indicating the determined content of running of the vehicle 10.

As described above, according to the present first example embodiment, the delay jitter specification unit 52 calculates a delay jitter distribution in a network that performs communication with the vehicle 10. The risk indicator specification unit 53 calculated the TTC of the vehicle 10, modifies the calculated TTC on the basis of the calculated delay jitter distribution, and specifies a risk indicator of the vehicle 10 on the basis of the modified TTC. The running management unit 54 and the running instruction unit 55 control the vehicle 10 on the basis of the specified risk indicator of the vehicle 10.

As described above, a risk indicator of the vehicle 10 is specified in consideration of a delay jitter distribution in a network, and therefore the vehicle can be appropriately controlled in view of a communication state of the network.

Second Example Embodiment

A remote control system 1A according to the present second example embodiment has a different configuration of the remote control apparatus 50 in comparison with the first example embodiment described above.

Accordingly, an example of a configuration of the remote control apparatus 50 according to the present second example embodiment is described below with reference to FIG. 7.

Figure 7:
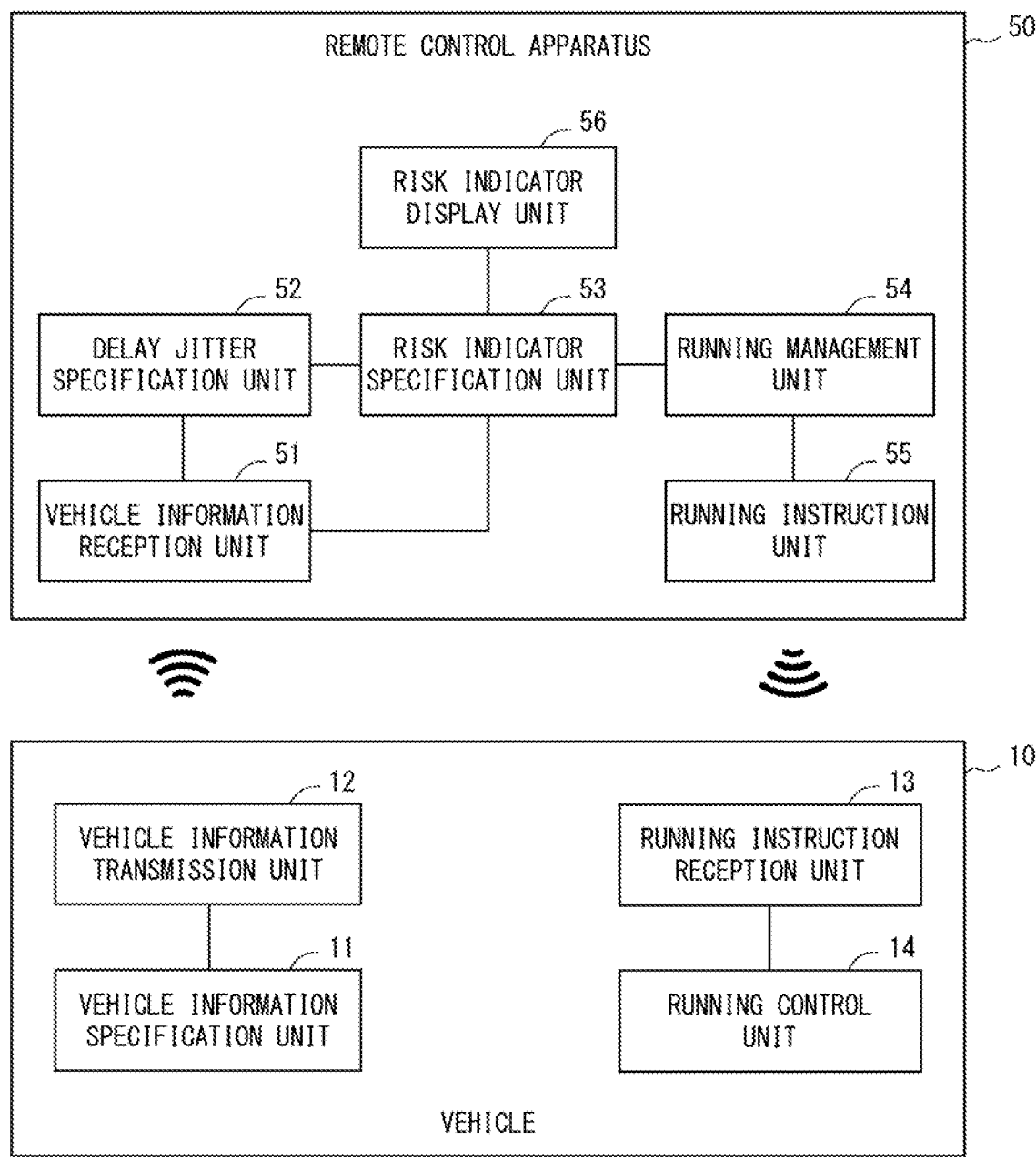
FIG. 7 is a block diagram illustrating examples of configurations of a vehicle and a remote control apparatus according to a second example embodiment.

As illustrated in FIG. 7, the remote control apparatus 50 according to the present second example embodiment is different in that a risk indicator display unit 56 is added, in comparison with the configuration of FIG. 2 according to the first example embodiment described above.

The risk indicator display unit 56 displays a risk indicator of the vehicle that has been specified by the risk indicator specification unit 53 on a screen of the remote control apparatus 50.

Figure 8:
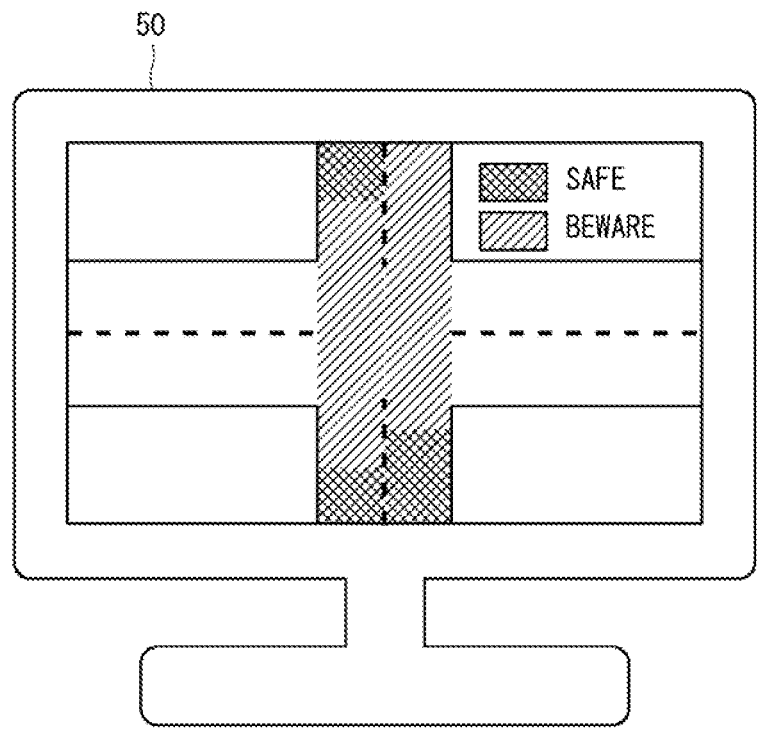
FIG. 8 is a diagram illustrating an example of a display of a risk indicator of a vehicle that has been conducted by a risk indicator display unit according to the second example embodiment.

An example of a display of a risk indicator of the vehicle 10 that has been conducted by the risk indicator display unit 56 is illustrated in FIG. 8. In the example of FIG. 8, the risk indicator display unit 56 classifies and displays a risk indicator of the vehicle 10 in each of the sections on the road by using patterns.

However, the example of the display illustrated in FIG. 8 is not restrictive. For example, the risk indicator display unit 56 may classify the risk indicator of the vehicle 10 in each of the sections on the road by using color. Furthermore, in a case where the risk indicator is greater than or equal to a value determined by a monitoring person (for example, in a case where the risk indicator falls under the region "risky" or "beware"), a report may be made, for example, by displaying a mark indicating a warning on the vehicle 10 that passes through a section having the risk indicator or by surrounding the vehicle 10 with a frame.

Furthermore, the risk indicator display unit 56 may display the risk indicator of the vehicle 10 together with vehicle information (positional information or the like) in the form of a list. Furthermore, if any of the sections has been designated by clicking or the like, the risk indicator display unit 56 may display detailed information relating to the designated section.

Figure 9:
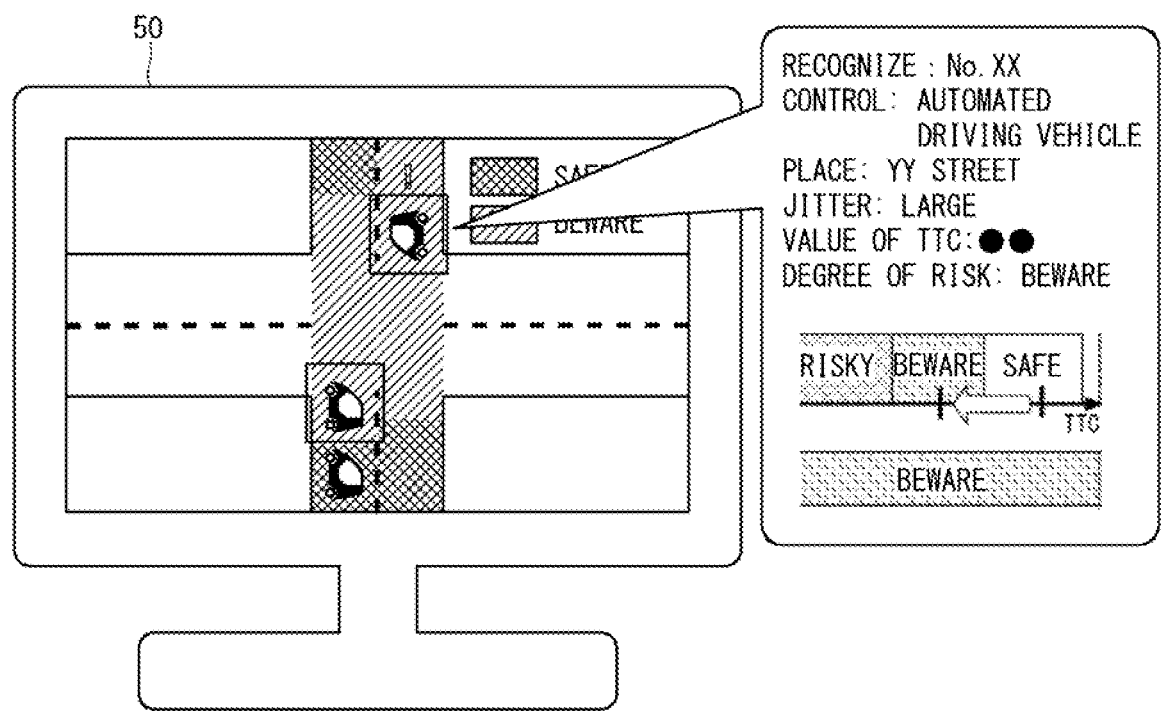
FIG. 9 is a diagram illustrating an example of a display of a risk indicator of a vehicle that has been conducted by the risk indicator display unit according to the second example embodiment.

Furthermore, the delay jitter specification unit 52 and the risk indicator specification unit 53 may simultaneously monitor a plurality of vehicles 10. In this case, the risk indicator specification unit 53 calculates a risk indicator of each of the plurality of vehicles 10. As an example of a display of the risk indicator of the vehicle 10 that has been conducted by the risk indicator display unit 56, an example of a display in a case where a plurality of vehicles 10 is simultaneously monitored is illustrated in FIG. 9. In the example of the display of FIG. 9, the risk indicator display unit 56 displays a plurality of vehicles 10. Then, if any of the vehicles 10 has been designated by clicking or the like, the risk indicator display unit 56 displays detailed information relating to the designated vehicle 10. FIG. 9 illustrates an example where the detailed information of the vehicle 10 is displayed in a balloon to be superimposed onto a monitoring screen, but a display method is not limited to this.

Figure 10:
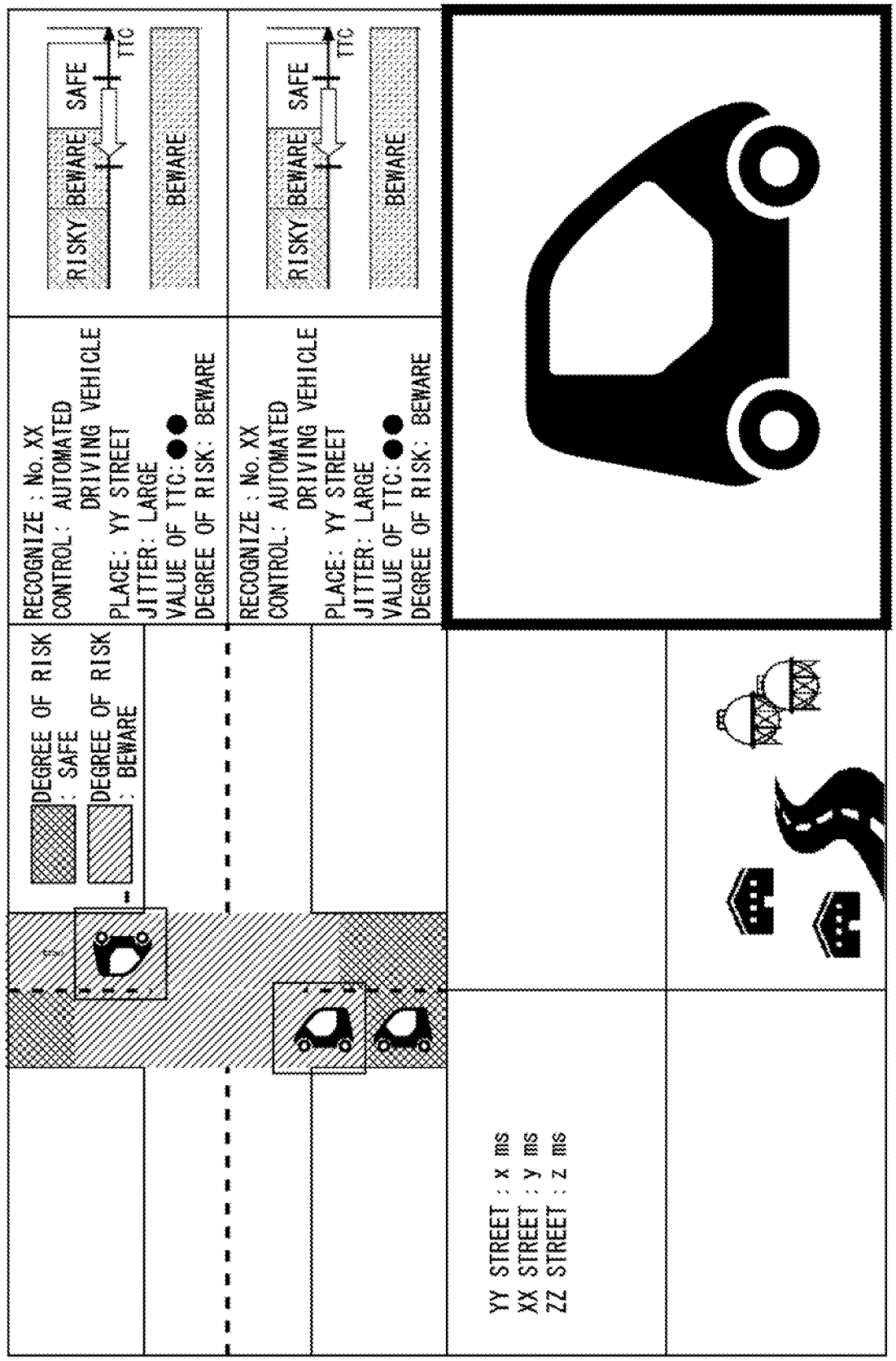
FIG. 10 is a diagram illustrating an example of a display of a risk indicator of a vehicle that has been conducted by the risk indicator display unit according to the second example embodiment.

Furthermore, another example of a display of a risk indicator of the vehicle 10 that has been conducted by the risk indicator display unit 56 is illustrated in FIG. 10. In the example of the display of FIG. 10, the risk indicator display unit 56 displays a screen for monitoring in an upper left-hand side portion of FIG. 10, and detailed information relating to the vehicle 10 may be displayed in a superimposed manner. The risk indicator display unit 56 may also display a video of a monitoring camera that takes a picture of the vehicle 10 or a video of a monitoring camera in the vicinity, as illustrated in a lower left-hand side portion of the FIG. 10. The risk indicator display unit 56 may also display a list of vehicles 10 having a high degree of risk, as illustrated in an upper right-hand side portion of FIG. 10. Furthermore, the risk indicator display unit 56 may conduct an enlarged display of a vehicle 10 that has been designated by clicking or the like, as illustrated in a lower right-hand side portion of FIG. 10, or may display a screen for remote driving in a case where the vehicle 10 is switched from automated driving to remote driving.

Furthermore, in the examples of the display of FIGS. 8 to 10, the risk indicator display unit 56 displays the risk indicator of the vehicle 10 on a screen of the remote control apparatus 50, but this is not restrictive. The risk indicator display unit 56 may display the risk indicator of the vehicle 10 in arbitrary display device other than the remote control apparatus 50 (for example, a display device of a monitoring center that monitors the road).

Note that the risk indicator display unit 56 may only display the risk indicator of the vehicle 10 in a case where the risk indicator of the vehicle 10 that has been specified by the risk indicator specification unit 53 is greater than or equal to a value determined by a monitoring person (for example, in a case where the risk indicator falls under the region "risky" or "beware").

Next, an example of a flow of an operation of the remote control apparatus 50 according to the present second example embodiment is described with reference to FIG. 11.

Figure 11:
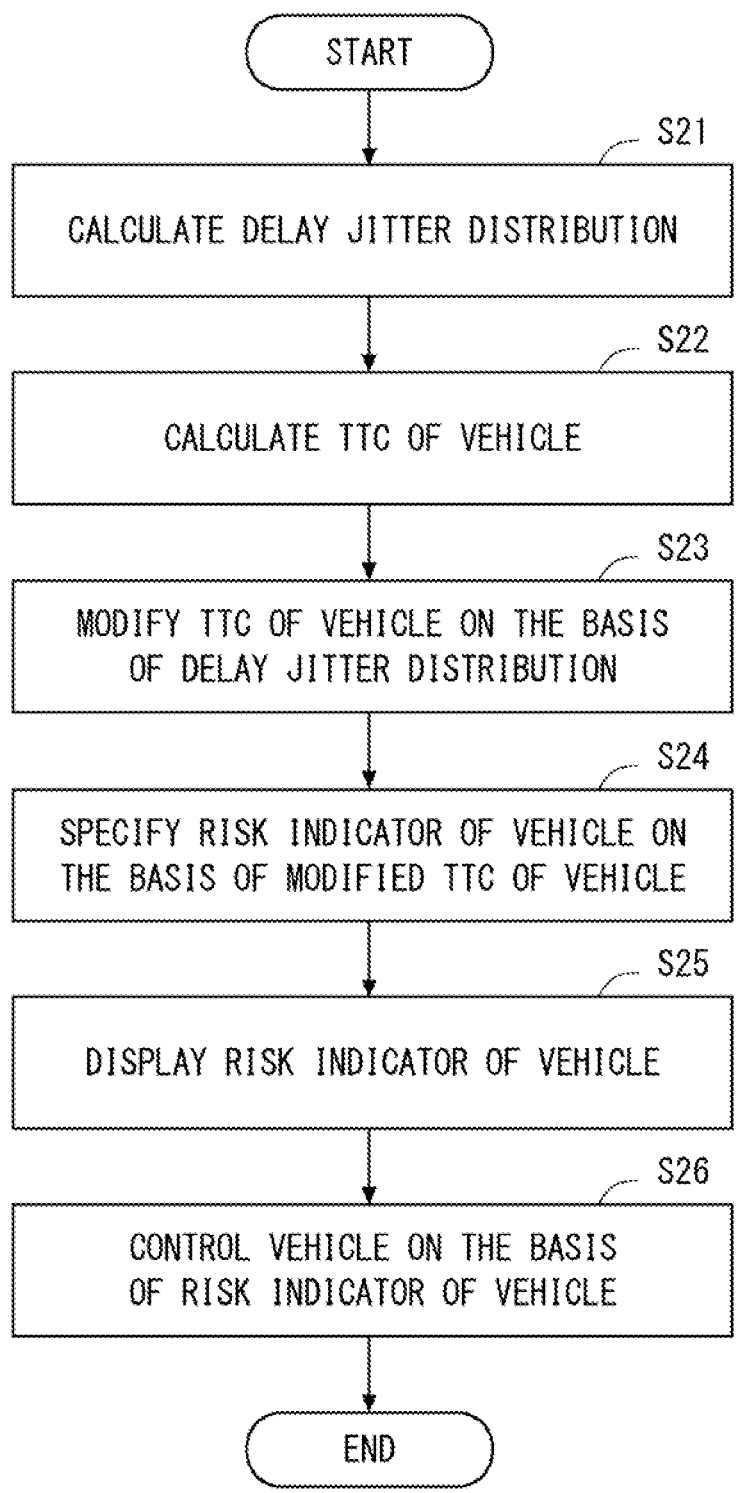
FIG. 11 is a flowchart illustrating an example of a flow of an operation of the remote control apparatus according to the second example embodiment.

As illustrated in FIG. 11, first, the processes of steps S21 to S24 that are similar to the processes of steps S11 to S14 in FIG. 6 according to the first example embodiment described above are performed.

Next, the risk indicator display unit 56 displays the risk indicator specified in step S24 of the vehicle 10 (step S25).

Then, the process of step S26 that is similar to the process of step S15 in FIG. 6 according to the first example embodiment described above is performed.

Note that in FIG. 11, the order of step S25 and step S26 may be changed, or step S25 and step S26 may be simultaneously performed.

As described above, according to the present second example embodiment, the risk indicator display unit 56 displays a risk indicator of the vehicle 10 that has been specified by the risk indicator specification unit 53. As a result of this, the risk indicator of the vehicle 10 can be reported to a monitoring person or the like that monitors the vehicle. Furthermore, if the vehicle 10 is an automated driving vehicle, the monitoring person that has viewed this display may perform switching from automated driving to remote driving performed by the monitoring person. In this case, the monitoring person may perform a remote driving operation, or may request that another remote operation staff perform the remote driving operation. Note that switching from automated driving to remote driving is not limited to switching performed by a monitoring staff, as described above, and the running management unit 54 and the running instruction unit 55 may forcibly perform switching on the basis of the risk indicator of the vehicle 10.

The other effects are similar to effects according to the first example embodiment described above.

OTHER EXAMPLE EMBODIMENTS

In the first and second example embodiments described above, the delay jitter specification unit 52 calculates a delay jitter distribution as a probability density function, and the risk indicator specification unit 53 modifies the TTC by using the delay jitter distribution. However, this is not restrictive. The delay jitter specification unit 52 may calculate delay jitter at the time of a predetermined probability such as an α-percentage point, and the risk indicator specification unit 53 may modify the TTC by using the delay jitter.

Furthermore, in the first and second example embodiments described above, the remote control apparatus 50 specifies the risk indicator of the vehicle 10, and controls the vehicle 10. However, this is not restrictive. The vehicle 10 may obtain vehicle information from another vehicle 10 directly or through the remote control apparatus 50, may specify a risk indicator of the other vehicle 10, and may control the other vehicle 10. In this case, it is sufficient if the vehicle includes components that correspond to the vehicle information reception unit 51, the delay jitter specification unit 52, the risk indicator specification unit 53, the running management unit 54, and the running instruction unit 55.

Furthermore, in the first and second example embodiments described above, the delay jitter specification unit 52 calculates delay jitter under the assumption that the vehicle 10 transmits a single piece of data in a single packet. However, this is not restrictive. The first and second example embodiments described above can also be applied to a case where the vehicle 10 transmits a single piece of data in a plurality of packets (for example, a case where moving image data is transmitted). In this case, it is sufficient if the delay jitter specification unit 52 calculates delay jitter according to Formula 1 described above, by using, for example, reception time of a first packet of the data and reception time of a rearmost packet of the data. In this case, if an identifier can be added to a packet, the delay jitter specification unit 52 can identify the rearmost packet by using the identifier. Furthermore, in a case where large-amount data, such as moving image data, is transmitted, it can be considered that the rearmost packet is a packet that follows continuous packets having a maximum transmission unit (MTU), and has the MTU or less. Therefore, the delay jitter specification unit 52 can identify the rearmost packet by comparing a packet size with a threshold.

Furthermore, in the first and second example embodiments described above, the running management unit 54 and the running instruction unit 55 control the running of the vehicle 10 on the basis of the risk indicator of the vehicle 10. However, this is not restrictive. For example, the running management unit 54 and the running instruction unit 55, or another control unit may perform network control, for example, to increase a network priority order of the vehicle 10. As a result of this, for example, a report can be made to the vehicle 10 with priority.

Concept of Example Embodiments

Next, an example of a configuration of a remote control system 100 that conceptually indicates the remote control systems 1 and 1A according to the first and second example embodiments described above is described with reference to FIG. 12.

Figure 12:
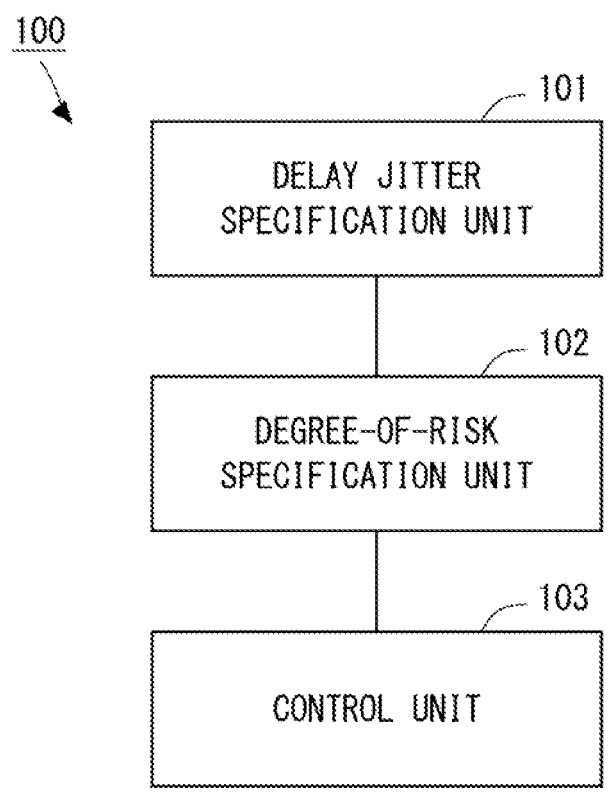
FIG. 12 is a block diagram illustrating an example of a configuration of a remote control system conceptually indicating the example embodiments.

The remote control system 100 illustrated in FIG. 12 includes a delay jitter specification unit 101, a degree-of-risk specification unit 102, and a control unit 103.

The delay jitter specification unit 101, the degree-of-risk specification unit 102, and the control unit 103 may be provided on any of a side of the remote control apparatus 50 and a side of the vehicle 10 according to the first and second example embodiments described above.

The delay jitter specification unit 101 corresponds to the delay jitter specification unit 52 according to the first and second example embodiments described above. The delay jitter specification unit 101 specifies a delay jitter distribution in a network that performs communication with a mobile object, such as a vehicle, that serves as a target to be monitored.

The degree-of-risk specification unit 102 corresponds to the risk indicator specification unit 53 according to the first and second example embodiments described above. The degree-of-risk specification unit 102 specifies a degree of risk of the mobile object on the basis of the delay jitter distribution specified by the delay jitter specification unit 101 and a state of the mobile object.

The state of the mobile object is, for example, a state of a position and speed of the mobile object. In a case where the state of the mobile object is the state of the position and speed, the degree-of-risk specification unit 102 may specify the time to collision (TTC) of the mobile object on the basis of the state of the mobile object, and may specify a degree of risk of the mobile object on the basis of the specified TTC and the delay jitter distribution specified by the delay jitter specification unit 101. More specifically, the degree-of-risk specification unit 102 may modify the specified TTC on the basis of the specified delay jitter distribution, and may specify a degree of risk of the mobile object on the basis of the modified TTC.

Furthermore, the state of the mobile object may be a state of a steering wheel, if the mobile object is an automobile. In a case where the state of the mobile object is the state of the steering wheel, the degree-of-risk specification unit 102 may provisionally determine a degree of risk according to whether the mobile object has suddenly turned the steering wheel, and may modify the provisionally determined degree of risk on the basis of the specified delay jitter distribution.

Furthermore, the delay jitter specification unit 101 may specify the delay jitter distribution as a probability density function. The degree-of-risk specification unit 102 may also modify the specified TTC by subtracting the specified delay jitter distribution from the specified TTC.

Furthermore, the delay jitter specification unit 101 may specify a delay jitter distribution in the network in each of the sections where the mobile object moves. The degree-of-risk specification unit 102 may also modify the specified TTC on the basis of the specified delay jitter distribution in each of the sections where the mobile object moves, and may specify a degree of risk of the mobile object on the basis of the modified TTC in each of the sections where the mobile object moves.

The control unit 103 corresponds to the running management unit 54 and the running instruction unit 55 according to the first and second example embodiments described above. The control unit 103 controls the mobile object on the basis of the degree of risk of the mobile object that has been specified by the degree-of-risk specification unit 102.

Note that the control unit 103 may only control the mobile object in a case where the degree of risk of the mobile object that has been specified by the degree-of-risk specification unit 102 is higher than a predetermined threshold. The control unit 103 may also control the running of the mobile object, or may perform network control to control a network priority order or the like of the mobile object.

Furthermore, the remote control system 100 may further include a display unit that displays the specified degree of risk. This display unit corresponds to the risk indicator display unit 56 according to the second example embodiment described above. This display unit may only display a degree of risk in a case where the degree of risk of the mobile object that has been specified by the degree-of-risk specification unit 102 is greater than or equal to a value determined by a monitoring person.

Next, an example of a flow of an operation of the remote control system 100 illustrated in FIG. 12 is described with reference to FIG. 13.

Figure 13:
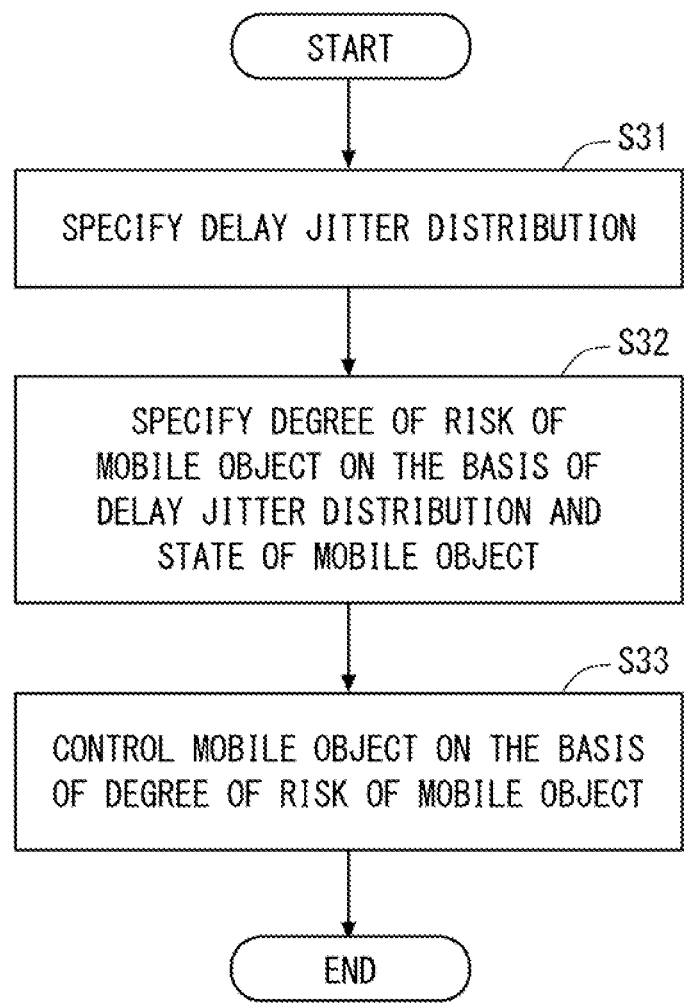
FIG. 13 is a flowchart illustrating an example of a flow of an operation of the remote control system illustrated in FIG. 12.

As illustrated in FIG. 13, first, the delay jitter specification unit 101 specifies a delay jitter distribution in a network that performs communication with a mobile object serving as a target to be monitored (step S31).

Next, the degree-of-risk specification unit 102 specifies a degree of risk of the mobile object on the basis of the delay jitter distribution specified in step S31 and a state of the mobile object (step S32).

Then, the control unit 103 controls the mobile object on the basis of the degree of risk of the mobile object that has been specified in step S32 (step S33).

As described above, by employing the remote control system 100 illustrated in FIG. 12, the delay jitter specification unit 101 specifies a delay jitter distribution in a network that performs communication with a mobile object serving as a target to be monitored. The degree-of-risk specification unit 102 specifies a degree of risk of the mobile object on the basis of the specified delay jitter distribution and a state of the mobile object. The control unit 103 controls the mobile object on the basis of the specified degree of risk of the mobile object.

As described above, a degree of risk of a mobile object is specified in consideration of a delay jitter distribution in a network, and therefore the mobile object can be appropriately controlled in view of a communication state of the network.

<Hardware Configurations of Remote Control Apparatus and Remote Control System According to Example Embodiments>

Next, a hardware configuration of a computer 90 that implements the remote control apparatus 50 according to the first and second example embodiments described above, and the remote control system 100 according to the concept of the example embodiments described above is described with reference to FIG. 14.

Figure 14:
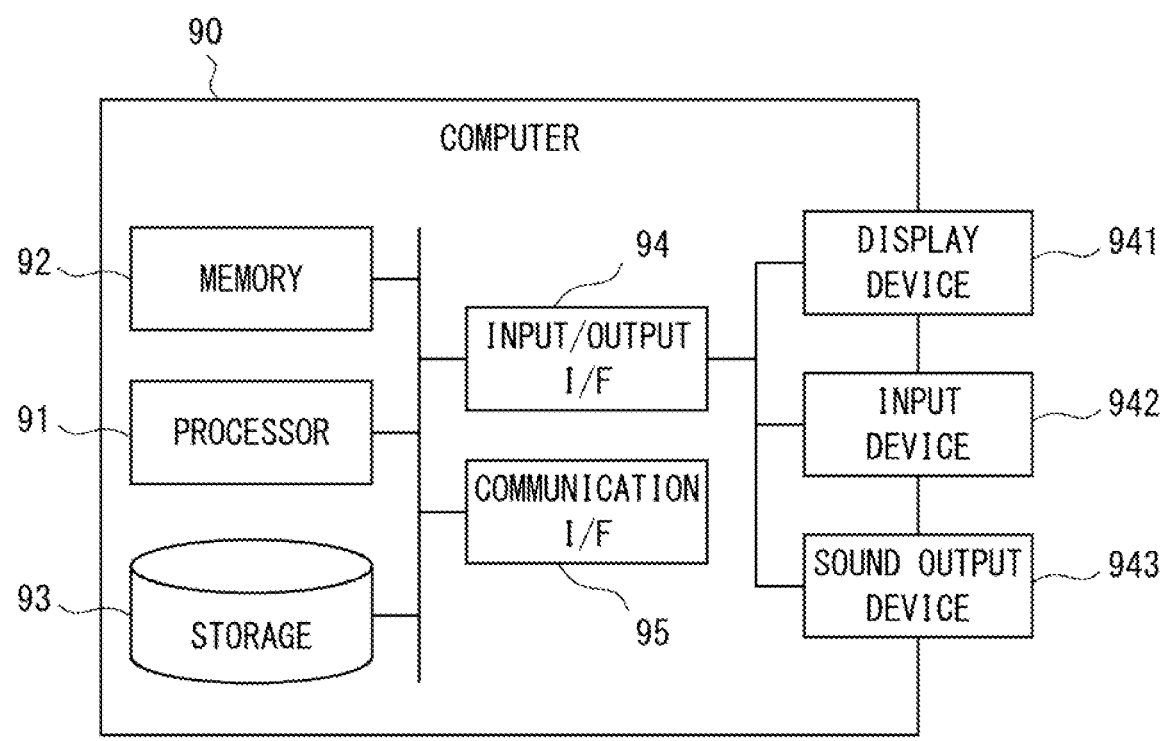
FIG. 14 is a block diagram illustrating an example of a hardware configuration of a computer that implements the remote control apparatus and the remote control system according to the example embodiments.

As illustrated in FIG. 14, the computer 90 includes a processor 91, a memory 92, a storage 93, an input/output interface (an input/output I/F) 94, a communication interface (a communication I/F) 95, and the like. The processor 91, the memory 92, the storage 93, the input/output interface 94, and the communication interface 95 are connected by a data transmission line for mutually transmitting or receiving data.

The processor 91 is an arithmetic processing device such as a central processing unit (CPU) or a graphics processing unit (GPU). The memory 92 is a memory such as a random access memory (RAM) or a read only memory (ROM). The storage 93 is a storage device such as a hard disk drive (HDD), a solid state drive (SSD), or a memory card. Furthermore, the storage 93 may be a memory such as a RAM or a ROM.

The storage 93 stores programs that achieve functions of components included in the remote control apparatus 50 and the remote control system 100. The processor 91 executes each of these programs, and therefore each of the functions of the components that are included in the remote control apparatus 50 and the remote control system 100 is achieved. Here, in executing each of the programs described above, the processor 91 may load these programs into the memory 92, and may execute the programs, or may execute the programs without loading the programs into the memory 92. Furthermore, the memory 92 or the storage 93 also plays a role of storing information or data that is held by the components included in the remote control apparatus 50 and the remote control system 100.

Furthermore, the programs described above can be stored by using various types of non-transitory computer readable media, and can be supplied to a computer (including the computer 90). The non-transitory computer readable media include various types of tangible storage media. Examples of the non-transitory computer readable medium include a magnetic storage medium (for example, a flexible disk, a magnetic tape, or a hard disk drive), a magneto-optical storage medium (for example, a magneto-optical disk), a compact disc-ROM (CD-ROM), a CD-recordable (CD-R), a CD-rewritable (CD-R/W), and a semiconductor memory (for example, a mask ROM, a programmable ROM (PROM), an erasable PROM (EPROM), a flash ROM, or a RAM. Furthermore, the programs may be supplied to the computer by various types of transitory computer readable media. Examples of the transitory computer readable medium include an electric signal, an optical signal, and electromagnetic waves. The transitory computer readable medium can supply the programs to the computer via a wired communication line such as electric wires and optical fibers, or a wireless communication line.

The input/output interface 94 is connected to a display device 941, an input device 942, a sound output device 943, or the like. The display device 941 is a device that displays a screen that corresponds to drawing data that has been processed by the processor 91, such as a liquid crystal display (LCD), a cathode ray tube (CRT) display, or monitor. The input device 942 is a device that receives an input of an operation performed by an operator, and is, for example, a keyboard, a mouse, a touch sensor, and the like. The display device 941 and the input device 942 may be integrated, and may be implemented as a touch panel. The sound output device 943 is a device that acoustically outputs sound that corresponds to acoustic data that has been processed by the processor 91, such as a speaker.

The communication interface 95 transmits or receives data to/from an external device. For example, the communication interface 95 performs communication with an external device via the wired communication line or the wireless communication line.

The present disclosure has been described above with reference to the example embodiments, but the present disclosure is not limited to the example embodiments described above. Various modifications that could be understood by those skilled in the art can be made to the configuration and details of the present disclosure within the scope of the present disclosure.

Furthermore, part or the entirety of the example embodiments described above can also be described as described in the following supplementary notes, but is not limited to the following.

(Supplementary Note 1)
A remote control apparatus including:
a delay jitter specification unit configured to specify a delay jitter distribution in a network that performs communication with a mobile object serving as a target to be monitored;
a degree-of-risk specification unit configured to specify a degree of risk of the mobile object on the basis of the delay jitter distribution that has been specified, and a state of the mobile object; and
a control unit configured to control the mobile object on the basis of the degree of risk that has been specified.

(Supplementary Note 2)
The remote control apparatus according to Supplementary Note 1, in which
the degree-of-risk specification unit performs:
specifying time to collision on the basis of the state of the mobile object, the time to collision being a remaining time period before collision of the mobile object; and
specifying the degree of risk of the mobile object on the basis of the delay jitter distribution that has been specified, and the time to collision that has been specified.

(Supplementary Note 3)
The remote control apparatus according to Supplementary Note 2, in which
the degree-of-risk specification unit performs:
modifying the time to collision that has been specified, on the basis of the delay jitter distribution that has been specified; and
specifying the degree of risk of the mobile object on the basis of the time to collision that has been modified.

(Supplementary Note 4)
The remote control apparatus according to Supplementary Note 3, in which
the delay jitter specification unit specifies the delay jitter distribution as a probability density function, and
the degree-of-risk specification unit modifies the time to collision that has been specified, by subtracting the delay jitter distribution that has been specified from the time to collision that has been specified.

(Supplementary Note 5)
The remote control apparatus according to Supplementary Note 3 or 4, in which
the delay jitter specification unit specifies the delay jitter distribution in the network in each of the sections where the mobile object moves, and
the degree-of-risk specification unit performs:
modifying the time to collision that has been specified, on the basis of the delay jitter distribution that has been specified, in each of the sections where the mobile object moves; and
specifying the degree of risk of the mobile object on the basis of the time to collision that has been modified, in each of the sections where the mobile object moves.

(Supplementary Note 6)
The remote control apparatus according to any one of Supplementary Notes 1 to 5, further including a display unit configured to display the degree of risk that has been specified.

(Supplementary Note 7)
A remote control method including:
a first step of specifying a delay jitter distribution in a network that performs communication with a mobile object serving as a target to be monitored;
a second step of specifying a degree of risk of the mobile object on the basis of the delay jitter distribution that has been specified, and a state of the mobile object; and
a third step of controlling the mobile object on the basis of the degree of risk that has been specified.

(Supplementary Note 8)
The remote control method according to Supplementary Note 7, in which
in the second step,
time to collision is specified on the basis of the state of the mobile object, the time to collision being a remaining time period before collision of the mobile object, and
the degree of risk of the mobile object is specified on the basis of the delay jitter distribution that has been specified, and the time to collision that has been specified.

(Supplementary Note 9)
The remote control method according to Supplementary Note 8, in which
in the second step,
the time to collision that has been specified is modified on the basis of the delay jitter distribution that has been specified, and
the degree of risk of the mobile object is specified on the basis of the time to collision that has been modified.

(Supplementary Note 10)

The remote control method according to Supplementary Note 9, in which
  in the first step, the delay jitter distribution is specified as a probability density function, and
  in the second step, the time to collision that has been specified is modified, by subtracting the delay jitter distribution that has been specified from the time to collision that has been specified.

(Supplementary Note 11)

The remote control method according to Supplementary Note 9 or 10, in which
  in the first step, the delay jitter distribution in the network is specified in each of the sections where the mobile object moves, and
  in the second step,
  the time to collision that has been specified is modified on the basis of the delay jitter distribution that has been specified, in each of the sections where the mobile object moves, and
  the degree of risk of the mobile object is specified on the basis of the time to collision that has been modified, in each of the sections where the mobile object moves.

(Supplementary Note 12)

The remote control method according to any one of Supplementary Notes 7 to 11, further including a fourth step of displaying the degree of risk that has been specified.

(Supplementary Note 13)

A remote control system including:
  a delay jitter specification unit configured to specify a delay jitter distribution in a network that performs communication with a mobile object serving as a target to be monitored;
  a degree-of-risk specification unit configured to specify a degree of risk of the mobile object on the basis of the delay jitter distribution that has been specified, and a state of the mobile object; and
  a control unit configured to control the mobile object on the basis of the degree of risk that has been specified.

(Supplementary Note 14)

The remote control system according to Supplementary Note 13, in which
  the degree-of-risk specification unit performs:
  specifying time to collision on the basis of the state of the mobile object, the time to collision being a remaining time period before collision of the mobile object; and
  specifying the degree of risk of the mobile object on the basis of the delay jitter distribution that has been specified, and the time to collision that has been specified.

(Supplementary Note 15)

The remote control system according to Supplementary Note 14, in which the degree-of-risk specification unit performs:
  modifying the time to collision that has been specified, on the basis of the delay jitter distribution that has been specified; and
  specifying the degree of risk of the mobile object on the basis of the time to collision that has been modified.

(Supplementary Note 16)

The remote control system according to Supplementary Note 15, in which the delay jitter specification unit specifies the delay jitter distribution as a probability density function, and
  the degree-of-risk specification unit modifies the time to collision that has been specified, by subtracting the delay jitter distribution that has been specified from the time to collision that has been specified.

(Supplementary Note 17)

The remote control system according to Supplementary Note 15 or 16, in which
  the delay jitter specification unit specifies the delay jitter distribution in the network in each of the sections where the mobile object moves, and
  the degree-of-risk specification unit performs:
  modifying the time to collision that has been specified, on the basis of the delay jitter distribution that has been specified, in each of the sections where the mobile object moves; and
  specifying the degree of risk of the mobile object on the basis of the time to collision that has been modified, in each of the sections where the mobile object moves.

(Supplementary Note 18)

The remote control system according to any one of Supplementary Notes 13 to 17, further including a display unit configured to display the degree of risk that has been specified.

REFERENCE SIGNS LIST 1, 1A REMOTE CONTROL SYSTEM
10 VEHICLE
11 VEHICLE INFORMATION SPECIFICATION UNIT
12 VEHICLE INFORMATION TRANSMISSION UNIT
13 RUNNING INSTRUCTION RECEPTION UNIT
14 RUNNING CONTROL UNIT
20 BASE STATION
30 INTERNET
40 CLOUD
50 REMOTE CONTROL APPARATUS
51 VEHICLE INFORMATION RECEPTION UNIT
52 DELAY JITTER SPECIFICATION UNIT
53 RISK INDICATOR SPECIFICATION UNIT
54 RUNNING MANAGEMENT UNIT
55 RUNNING INSTRUCTION UNIT
56 RISK INDICATOR DISPLAY UNIT
90 COMPUTER
91 PROCESSOR
92 MEMORY
93 STORAGE
94 INPUT/OUTPUT INTERFACE
941 DISPLAY DEVICE
942 INPUT DEVICE
943 SOUND OUTPUT DEVICE
95 COMMUNICATION INTERFACE
100 REMOTE CONTROL SYSTEM
101 DELAY JITTER SPECIFICATION UNIT
102 DEGREE-OF-RISK SPECIFICATION UNIT
103 CONTROL UNIT

What is claimed is:

1. A remote control apparatus comprising:
  at least one memory storing instructions; and
  at least one processor configured to execute the instructions to:
    specify a delay jitter distribution in a network that performs communication with a mobile object serving as a target to be monitored;
    specify a degree of risk of the mobile object on the basis of the delay jitter distribution that has been specified, and a state of the mobile object; and
    control the mobile object on the basis of the degree of risk that has been specified.

2. The remote control apparatus according to claim 1, wherein the at least one processor is further configured to execute the instructions to:
- specify time to collision on the basis of the state of the mobile object, the time to collision being a remaining time period before collision of the mobile object; and
- specify the degree of risk of the mobile object on the basis of the delay jitter distribution that has been specified, and the time to collision that has been specified.

3. The remote control apparatus according to claim 2, wherein the at least one processor is further configured to execute the instructions to:
- modify the time to collision that has been specified, on the basis of the delay jitter distribution that has been specified; and
- specify the degree of risk of the mobile object on the basis of the time to collision that has been modified.

4. The remote control apparatus according to claim 3, wherein the at least one processor is further configured to execute the instructions to:
- specify the delay jitter distribution as a probability density function; and
- modify the time to collision that has been specified, by subtracting the delay jitter distribution that has been specified from the time to collision that has been specified.

5. The remote control apparatus according to claim 3, wherein the at least one processor is further configured to execute the instructions to:
- specify the delay jitter distribution in the network in each of sections where the mobile object moves;
- modify the time to collision that has been specified, on the basis of the delay jitter distribution that has been specified, in each of the sections where the mobile object moves; and
- specify the degree of risk of the mobile object on the basis of the time to collision that has been modified, in each of the sections where the mobile object moves.

6. The remote control apparatus according to claim 1, further comprising a display unit configured to display the degree of risk that has been specified.

7. A remote control method comprising:
- a first operation comprising specifying a delay jitter distribution in a network that performs communication with a mobile object serving as a target to be monitored;
- a second operation comprising specifying a degree of risk of the mobile object on the basis of the delay jitter distribution that has been specified, and a state of the mobile object; and
- a third operation comprising controlling the mobile object on the basis of the degree of risk that has been specified.

8. The remote control method according to claim 7, wherein in the second operation:
- time to collision is specified on the basis of the state of the mobile object, the time to collision being a remaining time period before collision of the mobile object; and
- the degree of risk of the mobile object is specified on the basis of the delay jitter distribution that has been specified, and the time to collision that has been specified.

9. The remote control method according to claim 8, wherein in the second operation:
- the time to collision that has been specified is modified on the basis of the delay jitter distribution that has been specified; and
- the degree of risk of the mobile object is specified on the basis of the time to collision that has been modified.

10. The remote control method according to claim 9, wherein in the first operation, the delay jitter distribution is specified as a probability density function; and
- in the second operation, the time to collision that has been specified is modified, by subtracting the delay jitter distribution that has been specified from the time to collision that has been specified.

11. The remote control method according to claim 9, wherein in the first operation, the delay jitter distribution in the network is specified in each of sections where the mobile object moves, and
wherein, in the second operation:
- the time to collision that has been specified is modified on the basis of the delay jitter distribution that has been specified, in each of the sections where the mobile object moves; and
- the degree of risk of the mobile object is specified on the basis of the time to collision that has been modified, in each of the sections where the mobile object moves.

12. The remote control method according to claim 7, further comprising a fourth operation of displaying the degree of risk that has been specified.

13. A remote control system comprising:
- a delay jitter specification unit configured to specify a delay jitter distribution in a network that performs communication with a mobile object serving as a target to be monitored;
- a degree-of-risk specification unit configured to specify a degree of risk of the mobile object on the basis of the delay jitter distribution that has been specified, and a state of the mobile object; and
- a control unit configured to control the mobile object on the basis of the degree of risk that has been specified.

14. The remote control system according to claim 13, wherein the degree-of-risk specification unit is configured to perform:
- specifying time to collision on the basis of the state of the mobile object, the time to collision being a remaining time period before collision of the mobile object; and
- specifying the degree of risk of the mobile object on the basis of the delay jitter distribution that has been specified, and the time to collision that has been specified.

15. The remote control system according to claim 14, wherein the degree-of-risk specification unit is configured to perform:
- modifying the time to collision that has been specified, on the basis of the delay jitter distribution that has been specified; and
- specifying the degree of risk of the mobile object on the basis of the time to collision that has been modified.

16. The remote control system according to claim 15, wherein the delay jitter specification unit is configured to specify the delay jitter distribution as a probability density function, and
wherein the degree-of-risk specification unit is configured to modify the time to collision that has been specified, by subtracting the delay jitter distribution that has been specified from the time to collision that has been specified.

17. The remote control system according to claim 15, wherein the delay jitter specification unit is configured to specify the delay jitter distribution in the network in each of sections where the mobile object moves, and wherein the degree-of-risk specification unit is configured to perform:
- modifying the time to collision that has been specified, on the basis of the delay jitter distribution that has been specified, in each of the sections where the mobile object moves; and
- specifying the degree of risk of the mobile object on the basis of the time to collision that has been modified, in each of the sections where the mobile object moves.

18. The remote control system according to claim 13, further comprising a display unit configured to display the degree of risk that has been specified.

* * * * *